Patented Nov. 29, 1927.

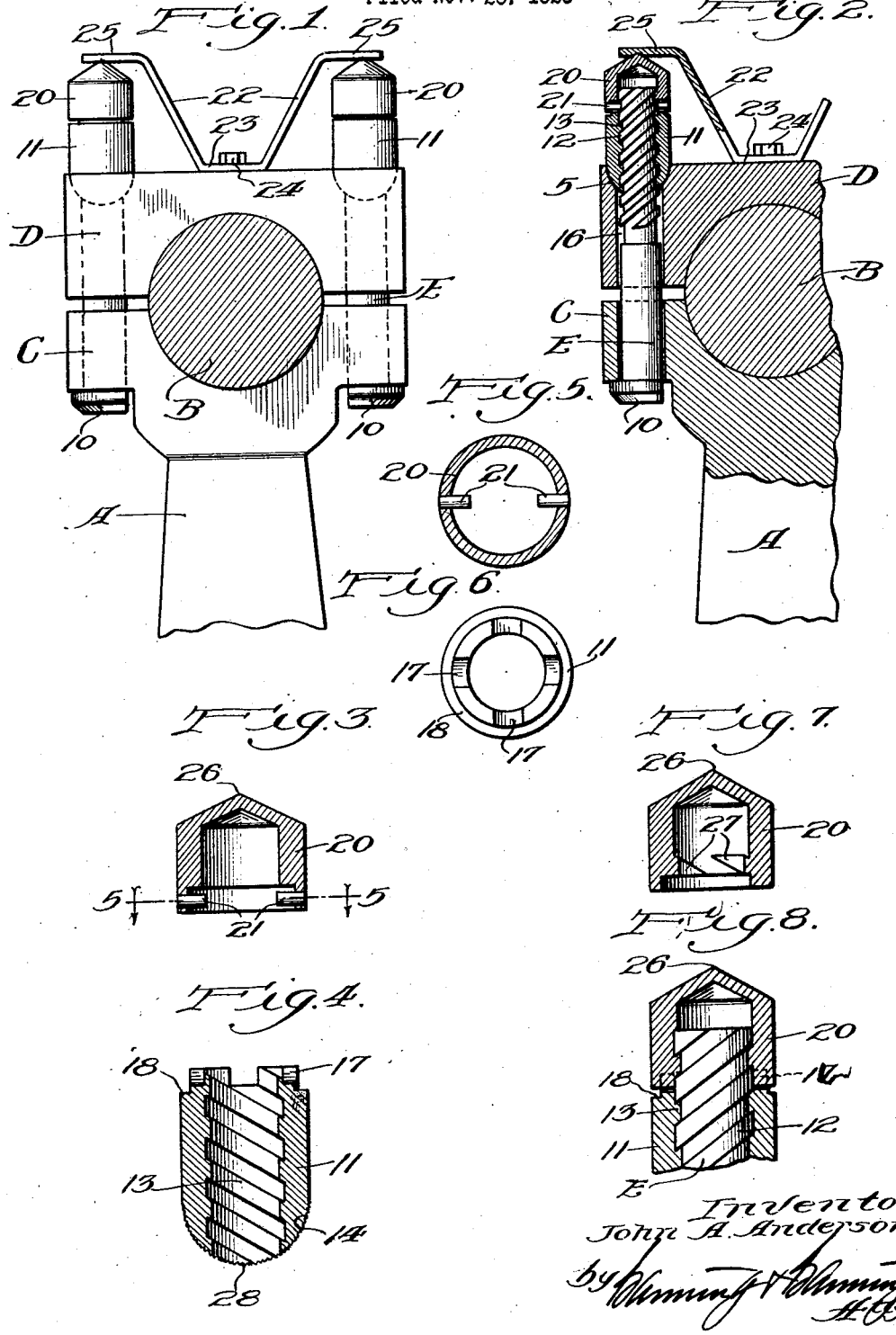

1,651,241

UNITED STATES PATENT OFFICE.

JOHN A. ANDERSON, OF GENESEO, ILLINOIS, ASSIGNOR TO BARTLETT S. GRAY, TRUSTEE, OF GENESEO, ILLINOIS.

AUTOMATIC TAKE-UP BOLT.

Application filed November 26, 1926. Serial No. 150,881.

This invention relates to a bolt having a nut with which is associated means for effecting automatically an advance thereof, whenever conditions will permit, whereby to take up any play or slack occasioned through wear or use of the parts connected by the bolt. It may be employed advantageously for many purposes, and particularly so in connection with a split bearing such as is commonly used in engines of various kinds. In the description to follow reference will be made to the present bolt in relation to a conventional split bearing, although, as above suggested, it may be applied to other uses as well.

It is an object of my invention to provide in a bolt of the character described simple and effective means which will act automatically to advance the nut to compensate for wear in the parts with which the bolt is associated. It is desirable that such a nut be freely rotatable to different positions of adjustment, and that it should not recede therefrom in response to thrusts of any kind. Split bearings are commonly employed with connecting rods which are secured to engine cranks, the tendency being with each reciprocation of such a rod to impose a thrust upon the head of the bolt or its associated nut. According to my invention, effective means are provided for preventing any reverse movement or end play of the nut upon the bolt threads whereon it is mounted, with the result that the nut and bolt head continue to exert an even pressure upon the associated parts at all times.

It is with objects such as these that the present improvements are concerned. Other advantages are also derived from my invention as will be pointed out hereinafter in the specification and claims.

An embodiment of my invention is set forth in the accompanying drawing in the manner following:

Figure 1 is a side elevation of one end of a connecting rod equipped with a split bearing the parts of which are held together by automatic take-up bolts which are shown in elevation;

Fig. 2 is a longitudinal section through the bolt shown in Fig. 1, and also through the bearing members with which said bolt is associated;

Fig. 3 is an enlarged detail of the cone cap which is applied to the nut on the bolt;

Fig. 4 is a longitudinal section through the nut;

Fig. 5 is a transverse section taken on line 5—5 of Fig. 3;

Fig. 6 is a top plan view of the nut shown in Fig. 4;

Fig. 7 which is a view similar to Fig. 3 shows a modified form of cone cap; and

Fig. 8 is a longitudinal section through the cap of Fig. 7 also a portion of a nut modified for association therewith.

As illustrative of one use to which my take-up bolt may be applied, I have shown in the drawing a connecting rod A in association with a crank pin B, the rod being formed to provide a bearing member C with which co-operates a companion member D in the conventional manner. A pair of bolts E are extended through the two bearing members to connect these parts together. Each bolt may be provided at one end with a head 10 which bears against one face of the member C, and at its other end is equipped with an adjustable nut 11 adapted to engage with the other bearing member D.

The bolts of this invention are each provided with screw threads 12 having by preference a rather steep pitch, 22½ degrees being suggested for this purpose. Co-operating screw threads 13 are formed on each nut so that these parts may be rotatably advanced in response to an end pressure exerted by any suitable means. The work engaging ends of the two nuts may be rounded as at 14 into substantially semi-spherical form so as to seat within rounded sockets 15 which are provided for this purpose in the bearing member D. If desired, the rounded end of the nut may also be serrated, as shown, so as to enhance its rotative friction with the work. The bolts may be extended through bores 16 of such size as to permit the head ends of the former to have a slight lateral movement therein, if desired. The opposite bolt ends, however, are centered in place due to the spherical sockets in which the nut ends are seated.

The outer end of each nut is slotted as at 17, and may also be recessed externally to provide an annular shoulder 18, as best shown in Fig. 7. By preference the slots 17 are four in number, being arranged about 90 degrees apart (see Fig. 6). Associated with each nut is a cap 20 which may take either of the forms shown in Figs. 3 and 7. In the former the cap is provided with a pair of inwardly protruding pins 21 diametrically arranged so as to lie within two of the slots 17, and present their inner ends against the body of the bolt between the screw threads 12 thereon. These pins accordingly serve as threads when engaged with the bolt threads, and because of their interlocking engagement within the slots 17, the cap, when assembled with the nut, as shown in Fig. 2, may not be removed from the bolt except by rotating both the nut and cap for this purpose. The walls of the cap at its open end may depend past the slots 17 so as to rest upon the shoulder 18.

To effect automatically a take-up of the nuts so as to compensate for wear in the bearings, spring means are provided. This may consist in each case of a pair of tension arms 22 which are extended divergingly from a common base 23 connected as by a screw 24 to the bearing member D. The extremity of each arm is outwardly turned as at 25 to overlie the cap 20 the cone shape of which provides a point 26 which may be received, if desired, within a shallow recess in the arm ends 25. The tendency of these two arms is to exert at all times a pressure upon the cone end of the cap which is thus pushed down upon the bolt and rotatively advanced thereupon. Due to the interlocking engagement between the cap and nut this latter part is also advanced so as to hold the bearing member D closely upon the co-operating bearing member of the connecting rod. In this manner any wear occurring in the bearing member is compensated for as fast as the same develops.

A generally similar construction is set forth in Figs. 7 and 8. As shown therein the nut is quite like that of Fig. 4, but the cap therefor, instead of having pins 21, is provided with internal threads 27 which co-act with the threads of the bolt. In this instance no interlocking connection between the cap and its associated nut is required, due to the fact that the cap remains engaged with the bolt threads and is rotatively advanced thereupon in response to pressure from the spring means. This rotative advancement is transmitted to the nut by pressure from the cap, and on account of the relatively steep pitch of the threads a rotative advancement of the nut takes place as fast as looseness or play develops.

It is to be noted that the nut threads 13 exert a thrust pressure against the under side of the bolt threads 12 as viewed in Fig. 2, when resisting separation of the two bearing members. The pins 21 (or threads 27) of the cap nut, however, exert a constant pressure against the upper face of the same bolt threads due to tension of the spring arm 22. Regardless of the wear which takes place in the threads of the bolt, or nut which is screwed thereupon, end play between these parts is obviated due to the opposing pressures which are exerted against the bolt threads when the parts are operatively assembled as shown in Fig. 2. This is highly important as the bearing members are thereby held securely against any play due to looseness in the threaded connection between the bolt and its associated nut.

The present bolt, when installed upon a traveling bearing, such as is present in one end of a connecting rod, is moved about in a path which develops forces of momentum in the direction of its own axis. The effect of this is a tendency alternately to advance and release the nut relative to the associated bearing. The advancement is enhanced by pressure from the spring arm 22 which serves also to resist retraction of the nut. To augment the opposing force of this spring radial serrations 28 may be provided on the bearing face of the nut whereby it may engage the work with greater friction. In some such manner as this I provide against a reactive loosening of the nut.

The entire assembly of parts forming the present take-up mechanism is simple and inexpensive and experience has proven its value in service. I desire, therefore, that protection should be accorded as defined by the claims following in which are set forth the essentials or principles of this invention.

I claim:

1. A nut and bolt having interengaging screw threads so pitched as to permit advancement of the former upon the latter in response to a pressure directed endwise upon the nut, a cap separable from the nut having co-operating screw threads for engagement with the bolt, and means for applying an endwise pressure to the cap which in turn is transmitted to the nut whereby the cap and nut are advanced rotatively upon the bolt, substantially as described.

2. A nut and bolt having interengaging screw threads so pitched as to permit rotative advancement of the former upon the latter in response to a force directed endwise of the nut, there being means associated with the nut terminating in a point which is disposed axially of the bolt past one end thereof, and means bearing upon said point and exerting thereupon a force which proceeds longitudinally of the bolt whereby the nut is rotatively advanced thereupon, substantially as described.

3. A nut and bolt having interengaging screw threads so pitched as to permit rotative advancement of the former upon the latter in response to a force directed endwise of the nut, the work engaging end of the nut being substantially semi-spherical in form, a member constituting the work having therethrough a passage wherein the bolt may be loosely accommodated, the passage terminating in a semi-spherical socket forming a seat for the semi-spherical end of the nut, the bolt being tiltable within the passage without disturbing the center of its engagement with the work, and pressure means exerting a force endwise of the nut for advancing the same upon the bolt whereby the nut is firmly held to its seat, substantially as described.

4. A nut and bolt having interengaging screw threads so pitched as to permit rotative advancement of the former upon the latter in response to a force directed endwise of the nut, the work engaging end of the nut being substantially semi-spherical in form, a member constituting the work having therethrough a passage wherein the bolt may be loosely accommodated, the passage terminating in a semi-spherical socket forming a seat for the semi-spherical end of the nut, the bolt being tiltable within the passage without disturbing the center of its engagement with the work, pressure means exerting a force endwise of the nut for advancing the same upon the bolt whereby the nut is firmly held to its seat, and friction means for opposing reactive rotation of the nut relative to its seat, substantially as described.

5. A nut and bolt having interengaging threads so pitched that the nut will advance rotatively upon the bolt in response to pressure directed endwise of the nut, means associated with the nut having a screw threaded connection with the bolt and extending past one end thereof in the form of a point which is disposed axially of the bolt, the said means being engaged with the nut, and a spring device bearing against said point and exerting thereupon a pressure which proceeds endwise of the nut whereby said means together with the nut may be rotatively advanced upon the bolt, substantially as described.

6. A nut and bolt having interengaging screw threads so pitched as to permit rotative advancement of the former upon the latter in response to a force directed endwise of the nut, a member constituting the work having therethrough a passage wherein the bolt may be loosely accommodated, the passage terminating in a socket forming a seat, and the work engaging end of the nut being formed to co-operate therewith, the nut having capacity to adjust itself within the seat according to any tilted portion of the bolt, and pressure means exerting a force endwise of the nut for advancing the same upon the bolt whereby the nut is firmly held to its seat, substantially as described.

JOHN A. ANDERSON.